United States Patent
Kanakubo et al.

(10) Patent No.: US 6,580,253 B2
(45) Date of Patent: Jun. 17, 2003

(54) BOOSTING AND STEP-DOWN SWITCHING REGULATOR CONTROLLING CIRCUIT AND BOOSTING AND STEP-DOWN SWITCHING REGULATOR FOR USE IN THE SAME

(75) Inventors: Yoshihide Kanakubo, Chiba (JP); Tomohiro Oka, Chiba (JP); Takeshi Naka, Tokyo (JP)

(73) Assignees: Seiko Instruments Inc. (JP); Device Engineering Co. (JP)

( * ) Notice: Subject to any disclaimer, the term of this patent is extended or adjusted under 35 U.S.C. 154(b) by 0 days.

(21) Appl. No.: 10/213,262

(22) Filed: Aug. 6, 2002

(65) Prior Publication Data

US 2003/0052654 A1 Mar. 20, 2003

(51) Int. Cl.⁷ .................................................. G05F 1/40
(52) U.S. Cl. ........................ 323/222; 323/259; 323/344; 323/282
(58) Field of Search ................................ 323/259, 344, 323/345, 222, 271, 282, 351

(56) References Cited

U.S. PATENT DOCUMENTS

| | | | | | |
|---|---|---|---|---|---|
| 5,289,361 | A | * | 2/1994 | Vinciarelli | 363/80 |
| 5,402,060 | A | * | 3/1995 | Erisman | 323/268 |
| 5,966,299 | A | * | 10/1999 | Rhew et al. | 363/124 |
| 6,411,531 | B1 | * | 6/2002 | Nork et al. | 363/60 |

\* cited by examiner

*Primary Examiner*—Bao Q. Vu
(74) *Attorney, Agent, or Firm*—Adams & Wilks

(57) ABSTRACT

A boosting and step-down switching regulator includes one error amplifying circuit, and an output of the error amplifying circuit is compared with a triangular wave for boosting and a triangular wave for step-down different in voltage level from each other but synchronous with each other in comparison circuits, respectively, to switch the boosting operation and the step-down operation over to each other. Thus, the boosting operation and the step-down operation can be readily switched over to each other irrespective of an input voltage and an output voltage.

11 Claims, 9 Drawing Sheets

BOOSTING AND STEP-DOWN SWITCHING REGULATOR CONTROLLING CIRCUIT AND BOOSTING AND STEP-DOWN SWITCHING REGULATOR FOR USE IN THE SAME

BACKGROUND OF THE INVENTION

1. Field of the Invention

The present invention relates to a switching regulator controlling circuit which is capable of switching readily a boosting operation and a step-down operation of a boosting and step-down switching regulator over to each other in accordance with the relationship among an input voltage, an output voltage and an output current, and a switching regulator for use in the same.

2. Description of the Related Art

Figure 11:
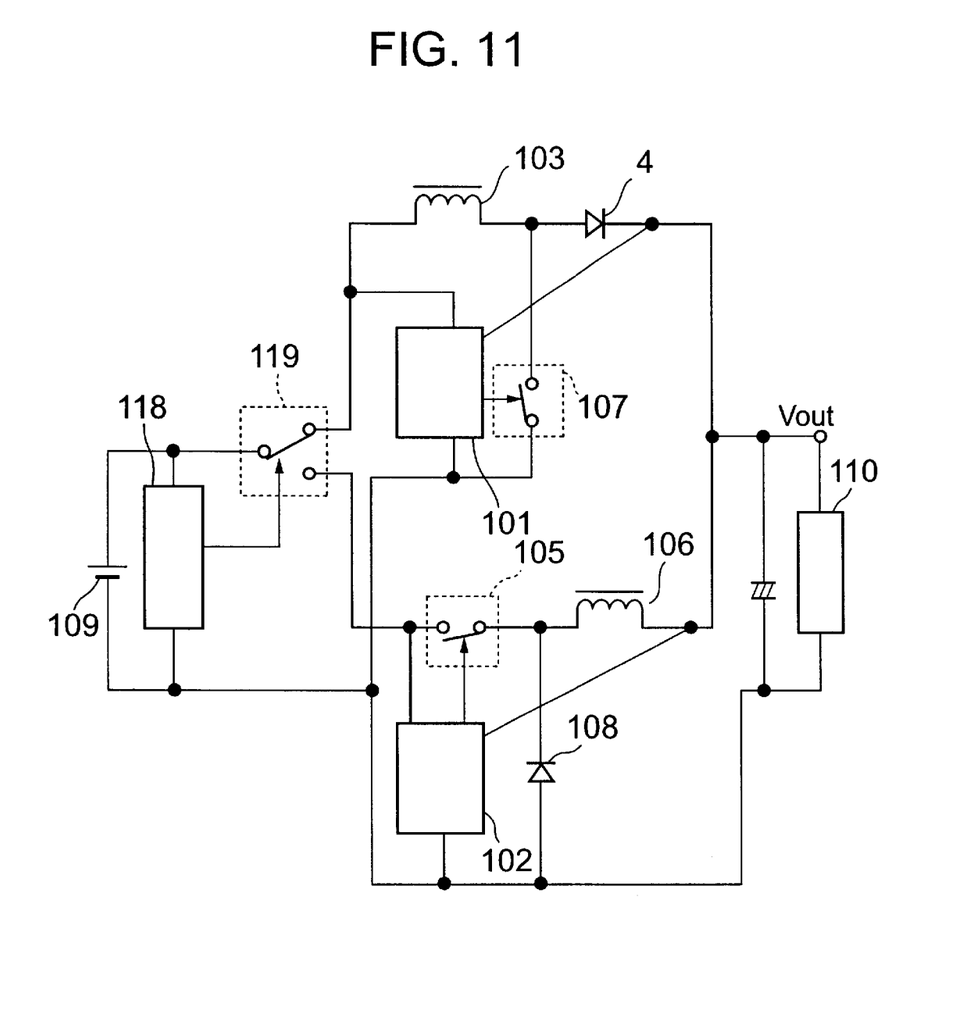
FIG. 11 is a circuit diagram, partly in block diagram, showing a structure of a conventional boosting and step-down switching regulator circuit.

As to an example of a conventional boosting and step-down switching regulator circuit, there is known a method as shown in FIG. 11 in which when a level of an input voltage is lower than that of an output voltage, a boosting switching regulator is operated, while when a level of the input voltage is higher than that of the output voltage, a step-down switching regulator is operated. A voltage detecting circuit 118 is operatively connected to a voltage power source 109 for supplying an input voltage in order to control a switch 119 on the basis of the input voltage. Then, when a level of the input voltage is lower than that of an output set voltage, the voltage power source 109 and a boosting side coil 103 are operatively connected to each other through the switch 119.

On the other hand, when a level of the input voltage is higher than that of the output set voltage, the voltage power source 109 and a boosting switch 105 are operatively connected to each other through the switch 119. That is to say, the switch 119 is operated with the voltage detecting circuit 118, whereby the switching of the boosting switching regulator and the step-down switching regulator is carried out to keep the level of the output voltage constant irrespective of the level of the input voltage.

Figure 12:
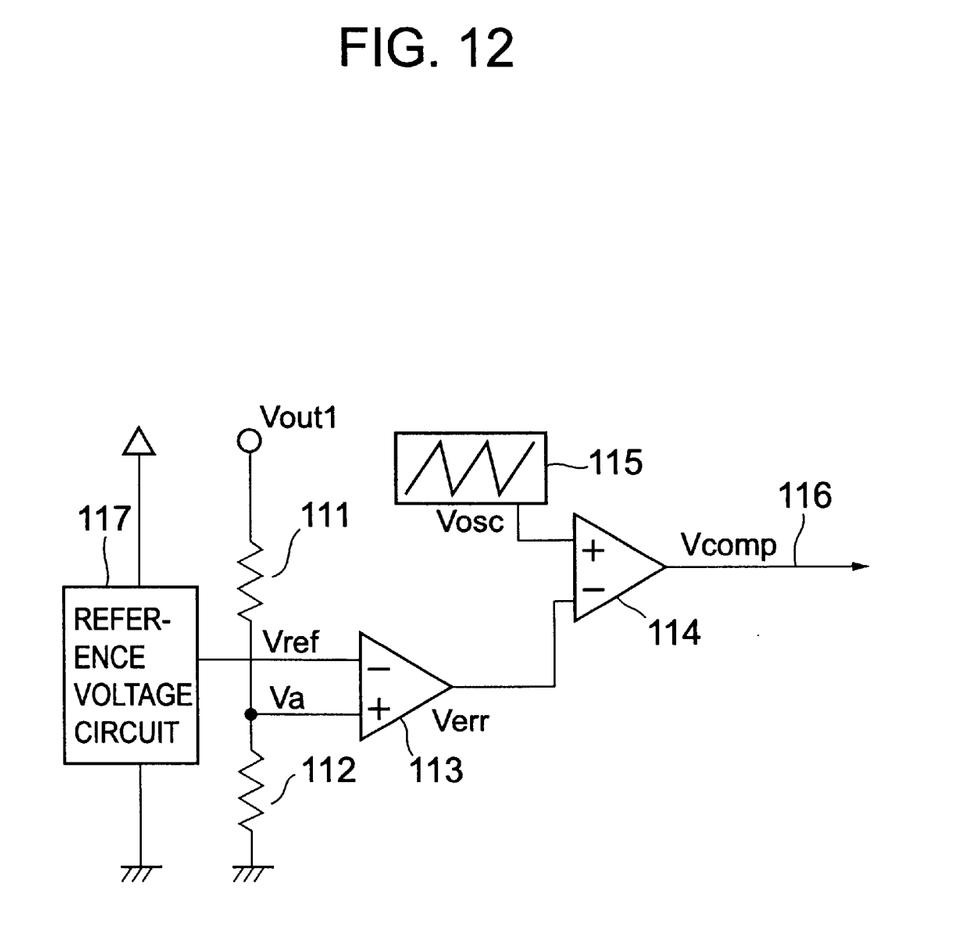
FIG. 12 is a circuit diagram useful in explaining the operation of the conventional boosting switching regulator controlling circuit.

Now, a conventional boosting switching regulator implements the controlling method as shown in FIG. 12 which is described as the prior art in JP 11-155281 A. First of all, a voltage level of Vout1 is detected, and then both of a voltage signal Va which has been obtained by dividing that voltage Vout1 through a division resistor 111 and a division resistor 112 and a reference voltage Vref which has been outputted from a reference voltage circuit 117 are amplified by an error amplifying circuit 113 to output an output voltage Verr. Next, a level of the output voltage Verr is compared with a triangular wave Vosc which has been outputted from an oscillation circuit 115 in a comparison circuit 114 to output a pulse which is used to control the boosting switch 107 shown in FIG. 11, thereby boosting an output voltage Vout so as to have to the voltage level higher than that of the input voltage. In addition, in the step-down switching regulator, similarly, the voltage level of Vout is detected, and then both of the voltage obtained through the resistive division and the reference voltage outputted from the reference voltage circuit are amplified by the error amplifying circuit. Then, the level of the outputted voltage is compared with the triangular wave outputted from the oscillation circuit in the comparison circuit to output a pulse used to control the step-down switch 105 shown in FIG. 11, thereby reducing the level of Vout down to a desired voltage level lower than that of the input voltage.

As described above, the operations of the switching regulator circuits are switched over to each other with the voltage detecting circuit, thereby carrying out the boosting and step-down operation.

However, since in the conventional boosting and step-down switching regulator, since the boosting switching regulator and the step-down switching regulator output the desired voltages, respectively, the voltage division resistors, the error amplifying circuits, and the coils are respectively required therefor. For example, there is encountered the problem in that while the input is switched over to another with the switch 119 when the operation is switched from the boosting operation to the step-down operation, the reduction in output voltage, a large-scale undershoot, a large-scale overshoot or the oscillation of the output voltage is caused until the switch has been perfectly switched so that the operation is perfectly switched from the boosting operation to the step-down operation. In addition thereto, there is the possibility that when the input fluctuation or the load fluctuation is carried out while the boosting operation and the step-down operation are switched over to each other with the switch 119, the output voltage may further oscillate.

SUMMARY OF THE INVENTION

In the light of the foregoing, the present invention has been made in order to solve the above-mentioned problems associated with the prior art, and it is therefore an object of the present invention to provide a boosting and step-down switching regulator controlling circuit in which resistors for voltage division, reference voltage circuits and error amplifying circuits which are respectively provided in a boosting switching regulator and a step-down switching regulator are made common to boosting switching regulator and the step-down switching regulator so that it is possible to reduce greatly the number of circuits.

In this case, a triangular oscillation circuit is controlled so as to oscillate a triangular wave for boosting and a triangular wave for step-down which are synchronous with each other but different in voltage level from each other, and a comparison circuit for boosting and a comparison circuit for step-down are respectively provided therein, whereby the control is carried out in such a way that if a level of an output voltage of one error amplifying circuit crosses the triangular wave for boosting, then a pulse used to control a switch for boosting is generated from an output terminal of the comparison circuit for boosting, while if the level of that output voltage of the one error amplifying circuit crosses the triangular wave for step-down, then a pulse used to control a switch for step-down is generated from an output terminal of the comparison circuit for step-down. As a result, whether the boosting operation or the step-down operation should be carried out can be automatically judged to carry out the switching therebetween in the inside of the switching regulator.

It is another object of the present invention to provide a boosting and step-down switching regulator controlling circuit which is capable of reducing the power consumption or enhancing the efficiency.

In this case, while two coils are conventionally required to be provided respectively, in the present invention, the boosting and step-down operation can be carried out with only one common coil, and also when a given input voltage is set to a desired output voltage, only the boosting operation is carried out if the boosting is required, while only the step-down operation is carried out if the step-down is required.

In order to solve the above-mentioned problems, according to the present invention, there is provided a boosting and step-down switching regulator circuit in which an output voltage of one common error amplifying circuit is compared with a triangular wave for boosting and a triangular wave for step-down which are synchronous with each other but are different in voltage level from each other in respective comparison circuits. As a result, the boosting operation and the step-down operation can be readily switched over to each other to reduce the power consumption and to enhance the efficiency.

BRIEF DESCRIPTION OF THE DRAWINGS

The above and other objects as well as advantages of the present invention-will become clear by the following description of the preferred embodiments of the present invention with reference to the accompanying drawings, wherein.

DETAILED DESCRIPTION OF THE PREFERRED EMBODIMENTS

By comparing an output voltage of one error amplifying circuit with a triangular wave for boosting and a triangular wave for step-down which are synchronous with each other but are different in voltage level from each other in respective comparison circuits, the boosting operation and the step-down operation are switched over.

The preferred embodiments of the present invention will hereinafter be described in detail with reference to the accompanying drawings.

First Embodiment

Figure 1:
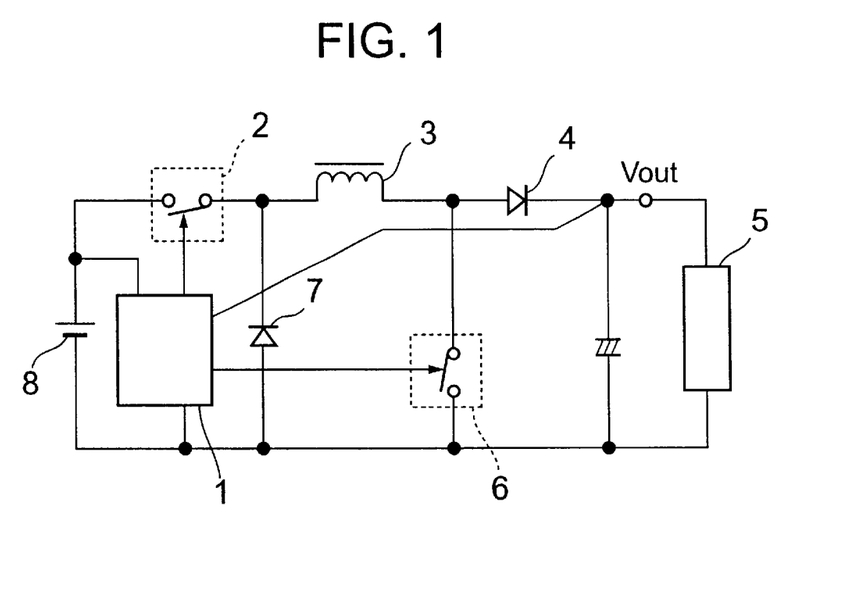
FIG. 1 is a circuit diagram, partly in block diagram, showing a structure of a boosting and step-down switching regulator circuit according to a first embodiment of the present invention.

FIG. 1 is a circuit diagram, partly in block diagram, showing a structure of a switching regulator according to a first embodiment of the present invention.

In the switching regulator, a switching regulator controlling circuit 1, a switch 2 for step-down, a switch 6 for boosting, a diode 7, a diode 4 and a coil 3 are operatively connected to one another. The switching regulator circuit 1 detects a voltage at a terminal Vout, and when the boosting operation is required in accordance with the relationship among an input voltage, an output voltage and an output current, ON/OFF of the switch 6 for boosting is controlled by the switching regulator controlling circuit 1, thereby boosting a level of the voltage at the terminal Vout up to a desired voltage level. In this connection, during the boosting operation, the switch 2 for step-down is normally in an ON state. On the other hand, when the step-down operation is required in accordance with the relationship among the input voltage, the output voltage and the output current, ON/OFF of the switch 2 for step-down is controlled by the switching regulator controlling circuit 1, thereby reducing the level of the voltage at the terminal Vout down to a desired voltage level. In this connection, during the step-down operation, the switch 6 for boosting is normally in an OFF state.

Next, the operation of the switching regulator controlling circuit 1 will be described in detail with reference to FIG. 2.

Figure 2:
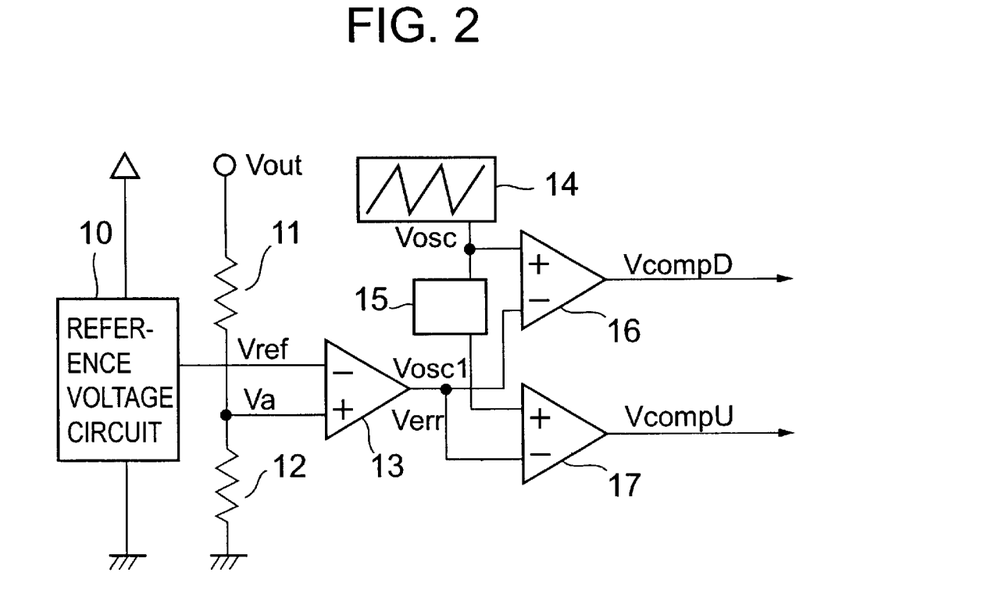
FIG. 2 is a circuit diagram showing a structure of a boosting and step-down switching regulator controlling circuit shown in FIG. 1.

FIG. 2 is a circuit diagram showing a structure of an internal circuit of the switching regulator controlling circuit 1 shown in FIG. 1. An output voltage Vout is resistively divided through a division resistor 11 and a division resistor 12 to be inputted in the form of Va to an error amplifying circuit 13. In addition, a reference voltage Vref of the reference voltage circuit 10 is inputted in the form of Vref to the error amplifying circuit 13 to amplify a difference voltage between the reference voltage Vref and the voltage Va obtained through the resistive division to output the difference voltage thus amplified in the form of an output voltage Verr. Next, an oscillation circuit 14 outputs a triangular wave Vosc which is in turn inputted to both of a comparison circuit 16 for step-down and a level shift circuit 15. The triangular wave Vosc which has been inputted to the level shift circuit 15 is then outputted in the form of a voltage Vosc1 which is synchronous with Vosc but is different in voltage level from Vosc to be inputted to a comparison circuit 17 for boosting. If the voltage Verr from an error amplifying circuit Verr has such a voltage level as to cross Vosc, then a rectangular wave VcompD is outputted from the comparison circuit for step-down to control a switch 2 for step-down shown in FIG. 1, thereby carrying out the step-down operation. At this time, a switch 6 for boosting is in an OFF state. In addition, if the voltage Verr from the error amplifying circuit has such a level as to cross Vosc1, then a rectangular wave VcompU is outputted from the comparison circuit for boosting to control the switch 6 for boosting shown in FIG. 1, thereby carrying out the step-down operation. At this time, the switch for step-down is in an ON state.

Figure 3:
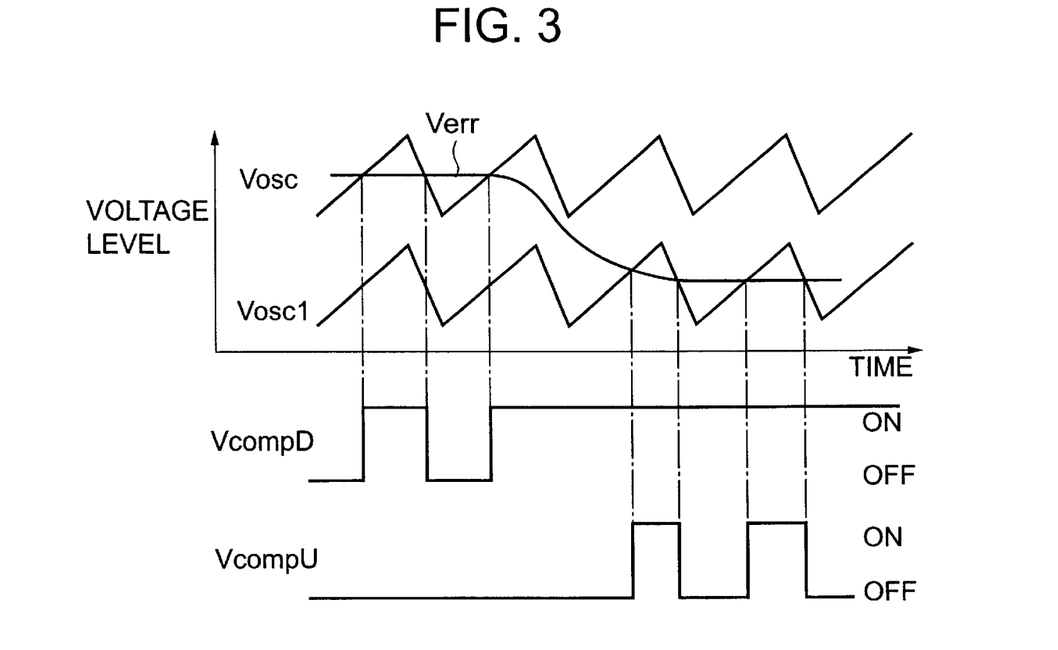
FIG. 3 is a timing chart useful in explaining the operation of the boosting and step-down switching regulator controlling circuit shown in FIG. 2.

Now, the relationship among the level of the output voltage Verr of the error amplifying circuit 13, the level of the output voltage VcompD of the comparison circuit 16 for step-down, and the level of the output voltage VcompU of the comparison circuit 17 for boosting is shown in FIG. 3. First of all, when the step-down operation is required in accordance with the relationship among the input voltage, the output voltage and the output current, Verr crosses the triangular wave Vosc for step-down to be compared with Vosc by the comparison circuit 16 for step-down to output a rectangular wave to the output terminal VcompD of the comparison circuit 16 for step-down, thereby controlling the switch 2 for step-down. If the output level of VcompD shown in FIG. 3 is high, then the switch 2 for step-down is turned ON. At this time, as apparent from FIG. 3 as well, it is understood that since the output voltage VcompU of the comparison circuit 17 for boosting has a low level, the switch 6 for boosting is in an OFF state.

Next, when the output voltage has become unable to be kept at a desired voltage level in the step-down operation due to the relationship among the input voltage, the output voltage and the output current, the level of the output voltage Vout begins to decrease and in response thereto, the level of the voltage Va obtained through the resistive division also decreases. Since the level of the voltage Va obtained through the resistive division begins to decrease, if the difference voltage between Va and the reference voltage Vref is amplified by the error amplifying circuit 13, then the level of the output voltage Verr of the error amplifying circuit 13 also begins to decrease. If the level of Verr begins to decrease, then Verr will not cross the triangular wave Vosc for step-down, but will cross the triangular wave Vosc1 for boosting having the level shifted from the triangular wave Vosc for step-down.

This phenomenon shows that a desired voltage level cannot be kept in the step-down operation due to the relationship among the input voltage, the output voltage and the output current, and hence the level of Verr decreases so that the partner for crossing is changed from the triangular wave Vosc for step-down to the triangular wave Vosc1 for boosting. Verr crosses the triangular wave Vosc1 for boosting to be compared with Vosc1 in the comparison circuit 17 for boosting to output the rectangular wave to an output terminal VcompU of the comparison circuit 17 for boosting, thereby controlling the switch 6 for boosting. If the level of the output voltage VcompU shown in FIG. 3 is high, then the switch 6 for boosting is turned ON. At this time, as apparent from FIG. 3 as well, it is understood that since the output voltage VcompU of the comparison circuit 17 for step-down is at a high level, the switch 2 for boosting is in an ON state.

In other words, the triangular wave for step-down and the triangular wave for boosting which are synchronous with each other but are different in voltage level from each other are provided for one common error amplifying circuit to be compared with the level of the output voltage of the one error amplifying circuit in the comparison circuits, respectively, to control the switch for boosting and the switch for step-down using the outputs therefrom, respectively. As a result, when the step-down operation is required in accordance with the relationship among the input voltage, the output voltage and the output current, the step-down operation is carried out, while when the boosting operation is required in accordance with the relationship among the input voltage, the output voltage and the output current, the boosting operation is carried out. Thus, the step-down operation and the boosting operation can be readily switched over to each other in accordance with the relationship among the input voltage, the output voltage and the output current.

In addition, when a desired output voltage can be outputted through only the boosting operation, only the boosting operation is carried out, while a desired output voltage can be outputted through only the step-down operation, only the step-down operation is carried out. Accordingly, not only the current consumption is remarkably reduced, but also the efficiency of the whole boosting and step-down switching regulator is greatly enhanced.

Second Embodiment

Figure 4:
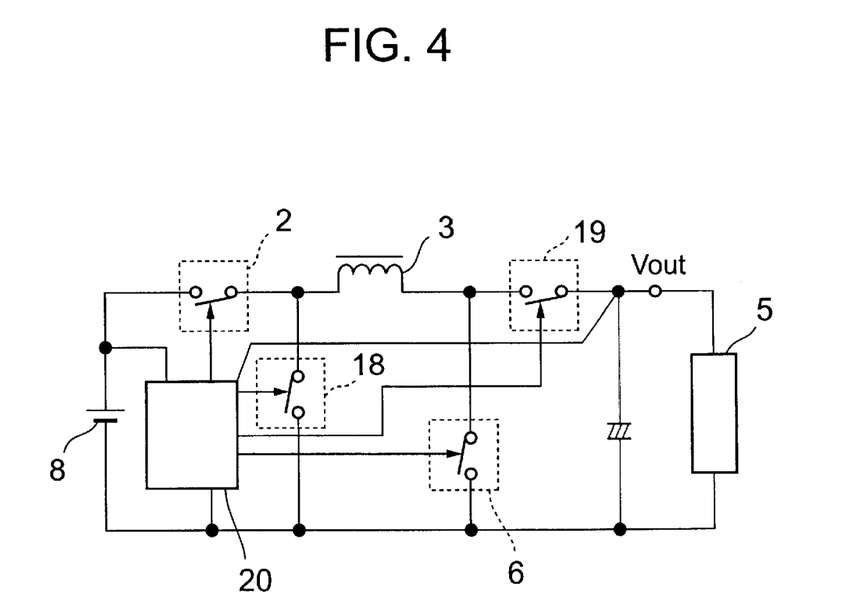
FIG. 4 is a circuit diagram, partly in block diagram, showing a structure of a boosting and step-down switching regulator circuit according to a second embodiment of the present invention.

FIG. 4 is a circuit diagram, partly in block diagram, showing a structure of a switching regulator according to a second embodiment of the present invention. Comparing the second embodiment shown in FIG. 4 with the first embodiment shown in FIG. 1, it is understood that the diode 4 is replaced with a switch 19, and the diode 7 is replaced with a switch 18.

With this structure, though the basic operations of the switching regulator for boosting and the switching regulator for step-down are not changed, the switch 19 and the switch 6 for boosting are made synchronous with each other to carry out the boosting operation, whereby it is possible to suppress the loss for a current which is caused to flow through the diode 4 during the boosting operation. In addition, similarly, the switch 18 and the switch 2 for step-down are made synchronous with each other to carry out the step-down operation, whereby it is possible to suppress the loss for the current caused to flow through the diode 7 during the step-down operation. But, at this time, it is prohibited that the switch 2 for step-down and the synchronous switch 18 for step-down are simultaneously turned ON, the switch 6 for boosting and the synchronous switch 19 for boosting are simultaneously turned ON, or the synchronous switch 18 for step-down and the switch 6 for boosting are simultaneously turned ON. This reason is t hat since when the energy is accumulated in the coil due to the short circuit between the power source and GND, the short circuit between the output voltage and GND, or the switching, that energy will be discharged to GND, which results in that all of the energy becomes the useless loss.

The boosting and step-down switching regulator circuit 20 shown in FIG. 4 is structured by adding the logic in which the simultaneous ON between the switch 2 for step-down and the synchronous switch 18 for step-down, the simultaneous ON between the switch 6 for boosting and the synchronous switch 19 for boosting, or the simultaneous ON between the synchronous switch 18 for step-down and the switch 19 for boosting is prohibited from being carried out to the boosting and step-down switching regulator circuit 1 shown in FIG. 1. By carrying out the above-mentioned control, the efficiency is further enhanced as compared with the first embodiment.

Third Embodiment

Figure 5:
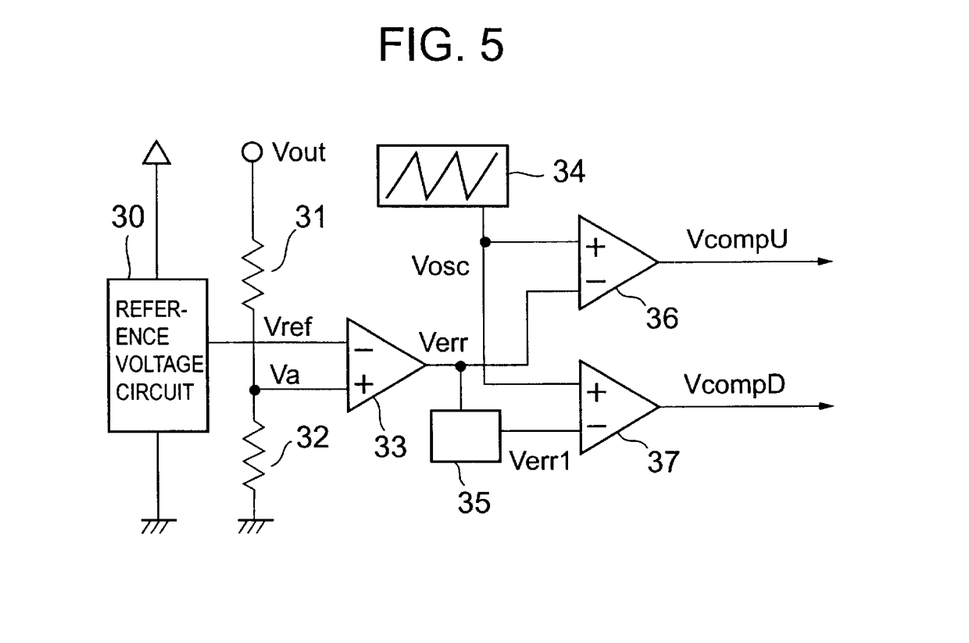
FIG. 5 is a circuit diagram showing a structure of the boosting and step-down switching regulator controlling circuit shown in FIG. 1 according to a third embodiment of the present invention.

Next, a third embodiment of the present invention will be described. The operation of the switching regulator controlling circuit 1 shown in FIG. 1 will now be described in detail with reference to FIG. 5. FIG. 5 is a circuit diagram showing a structure of an internal circuit of the switching regulator controlling circuit 1 shown in FIG. 1. An output voltage Vout is resistively divided through a division resistor 31 and a division resistor 32 to be inputted in the form of Va to an error amplifying circuit 33. In addition, an output voltage of a reference voltage circuit 30 is inputted in the form of Vref to the error amplifying circuit 33 to amplify a difference voltage between the voltage Va obtained through the resistive division and the reference voltage Vref to output an output voltage in the form of Verr which is in turn inputted to both of a comparison circuit 36 for boosting and a level shift circuit 35.

The output voltage Verr inputted to the level shift circuit 35 is outputted in the form of Verr1 which is different in voltage level from Verr to be inputted to a comparison circuit 37 for step-down. If Verr1 has such a voltage level as to cross Vosc, then the rectangular wave VcompD is outputted from the comparison circuit for step-down to control the switch 2 for step-down shown in FIG. 1, thereby carrying out the step-down operation. At this time, the switch 6 for boosting is in an OFF state. In addition, if Verr has such a voltage level as to cross Vosc, then the rectangular wave VcompU is outputted from the comparison circuit for boosting to control the switch 6 for boosting shown in FIG. 1, thereby carrying out the boosting operation. At this time, the switch for step-down is in an ON state.

Figure 6:
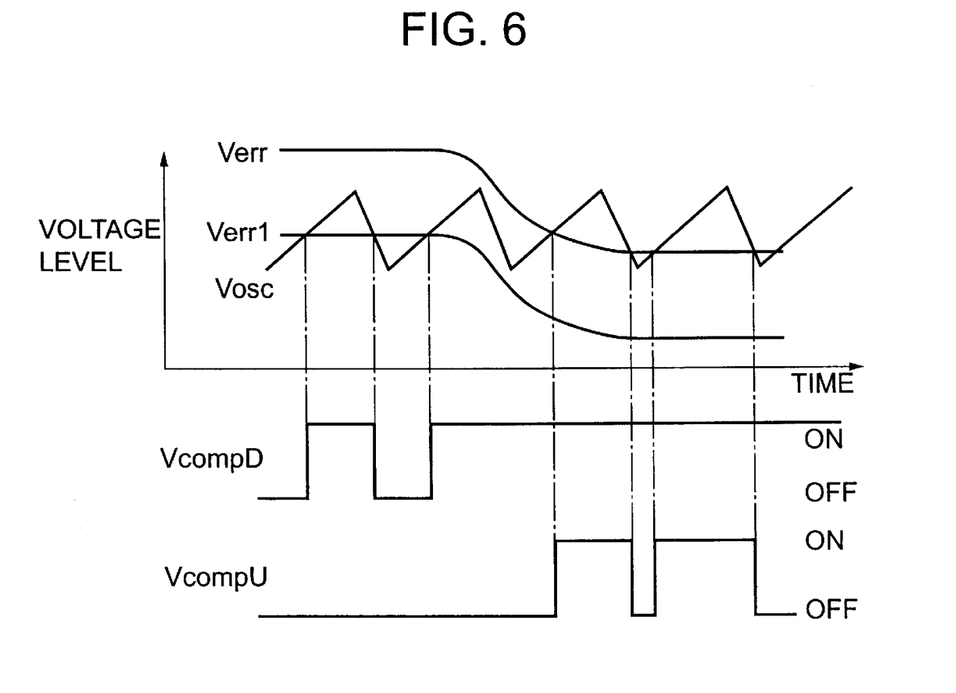
FIG. 6 is a timing chart useful in explaining the operation of the boosting and step-down switching regulator controlling circuit shown in FIG. 5.

Now, the relationship among the level of the output voltage Verr of the error amplifying circuit, the level of the output voltage Verr1 of the level shift circuit, the level of the output voltage VcompU of the comparison circuit 36 for boosting, and the level of the output voltage VcompD of the comparison circuit 37 for step-down is shown in FIG. 6. First of all, when the step-down operation is required in accordance with the relationship among the input voltage, the output voltage and the output current, Vosc crosses the output voltage Verr1 of the level shift circuit to be compared with Verr1 in the comparison circuit 37 for step-down to output the rectangular wave to the output terminal VcompD of the comparison circuit 37 for step-down, thereby controlling the switch 2 for step-down. If the level of the output voltage VcompD shown in FIG. 6 is high, then the switch 2 for step-down is turned ON. At this time, as apparent from FIG. 6 as well, it is understood that since the output voltage VcompU of the comparison circuit 17 for boosting is at a low voltage level, the switch 6 for boosting is in an OFF state.

Next, if the output voltage becomes unable to be kept at a desired voltage level in the step-down operation due to the relationship among the input voltage, the output voltage and the output current, then the level of the output voltage Vout begins to decrease and in response thereto, the level of the voltage Va obtained through the resistive division also begins to decrease. Since the level of the voltage Va obtained through the resistive division begins to decrease, if the difference voltage between Va and the reference voltage Vref is amplified by the error amplifying circuit 33, then the level of the output voltage Verr of the error amplifying circuit 33 also begins to decrease. If the level of Verr begins to decrease, then Verr1 obtained through the level shift also begins to decrease so that Verr1 will not cross the rectangular wave Vosc, but Verr will cross Vosc. This shows that since the desired voltage level becomes unable to be kept in the step-down operation due to the relationship among the input voltage, the output voltage and the output current and the level of Verr decreases, Verr1 obtained through the level shift will not cross Vosc, but Verr will cross Vosc. Verr crosses the triangular wave Vosc to be compared with Vosc in the comparison circuit 36 for boosting to output the rectangular wave to the output terminal VcompU of the comparison circuit 16 for boosting, thereby controlling the switch 6 for boosting. If the output level of VcompU shown in FIG. 3 is high, then the switch 6 for boosting is turned ON. At this time, as apparent from FIG. 3 as well, it is understood that since the output voltage VcompD of the comparison circuit 17 for step-down is at a high voltage level, the switch 2 for step-down is in an ON state.

In other words, for one triangular wave, two output voltages of the error amplifying circuit which are different in voltage level from each other are provided to be compared with Verr and Verr1 in the respective comparison circuits to control the switch for boosting and the switch for step-down using the respective output voltages. As a result, when the step-down operation is required in accordance with the relationship among the input voltage, the output voltage and the output current, the step-down operation is carried out, while when the boosting operation is required due to the relationship among the input voltage, the output voltage and the output current, the boosting operation is carried out. Accordingly, the step-down operation and the boosting operation can be readily switched over to each other in accordance with the relationship among the input voltage, the output voltage and the output current.

In addition, when the desired voltage can be outputted through only the boosting operation, only the boosting operation is carried out, while when the desired voltage can be outputted through only the step-down operation, only the step-down operation is carried out. As a result, not only the power consumption is remarkably reduced, but also the efficiency of the whole boosting and step-down switching regulator is greatly enhanced.

In addition, in the boosting and step-down switching regulator circuit according to the third embodiment as well, the boosting and step-down operation can be carried out at high efficiency with the same circuit structure as that shown in the second embodiment.

Figure 7:
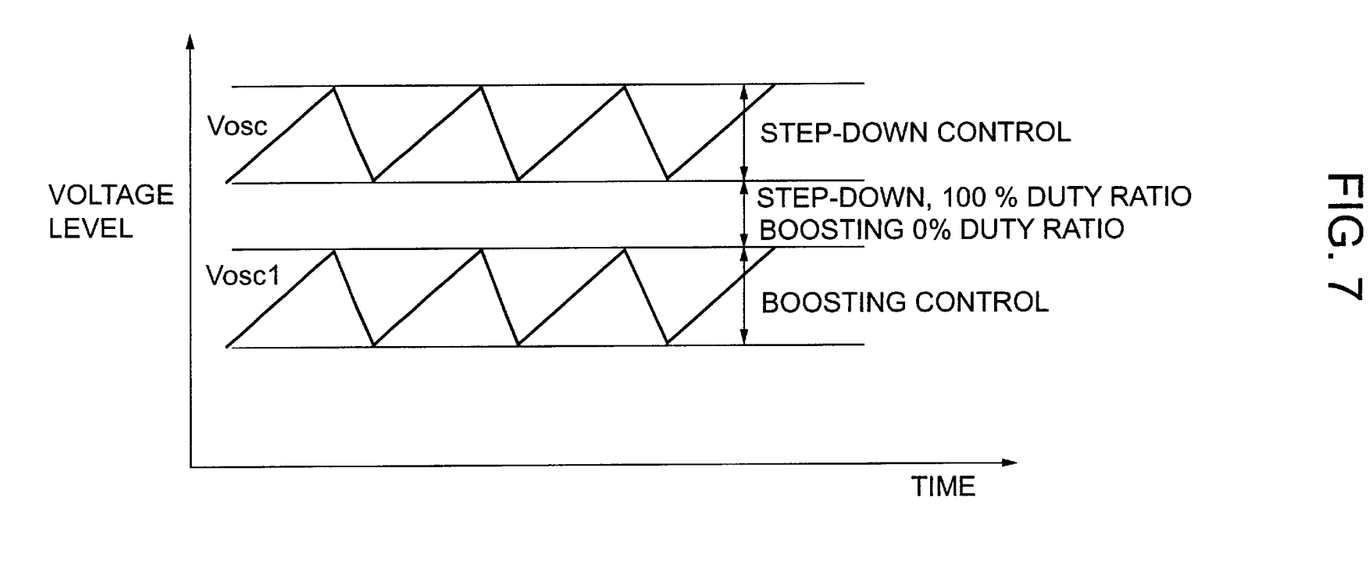
FIG. 7 is a graphical representation useful in explaining an output of an internal oscillation circuit shown in FIG. 2.

No voltage level of each of the triangular waves is referred in the boosting and step-down switching regulator circuit shown in the first and second embodiments described above. However, the contents shown in FIG. 3 show the operation in the case where there is no crossing between the triangular wave for boosting and the triangular wave for step-down. In the first embodiment, no crossing between the triangular wave for boosting and the triangular wave for step-down enables the boosting operation and the step-down operation to be perfectly separated from each other. Thus, the operation for controlling oscillation of the boosting switch in the boosting operation and the operation for controlling oscillation of the step-down switch in the step-down operation are not mixed with each other at all. As shown in FIG. 7, during the operation between the triangular wave for boosting and the triangular wave for step-down, the switch for boosting is in an OFF state, while the switch for step-down is in an ON state. This is the case where the level of the input voltage is near the level of the output voltage, and thus the input voltage and the output voltage maintain the short circuit operation. Consequently, in the case where there is no crossing between the triangular wave for boosting and the triangular wave for step-down, the operation can be smoothly switched over from the boosting operation to the step-down operation, or from the step-down operation to the boosting operation through the duty ratio of 100% in the step-down operation and the duty ratio of 0% in the boosting operation.

Fourth Embodiment

Figure 8:
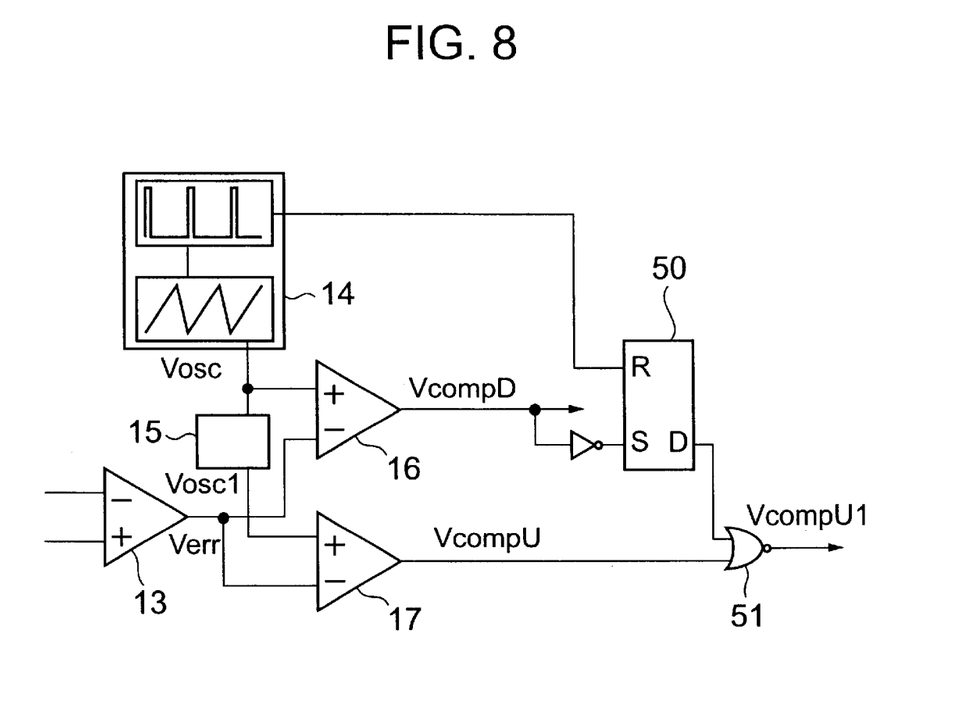
FIG. 8 is a circuit diagram showing a structure of the boosting and step-down switching regulator controlling circuit shown in FIG. 1 according to a fourth embodiment of the present invention.
Figure 9:
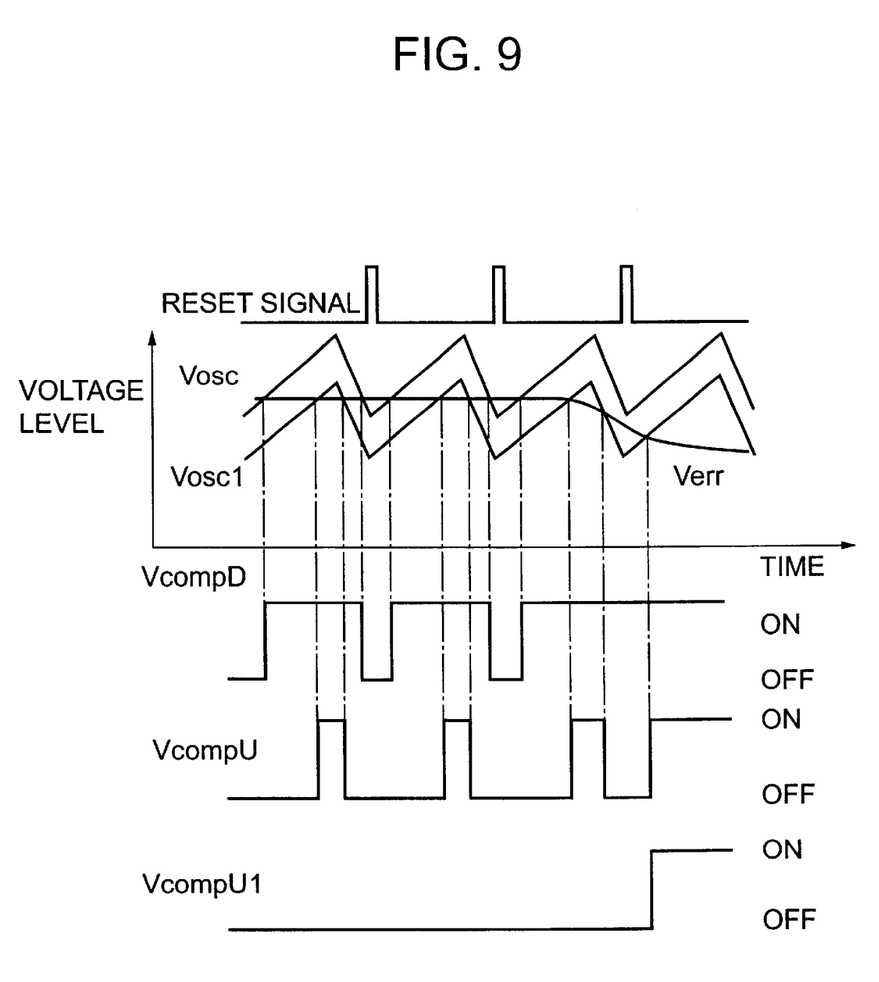
FIG. 9 is a timing chart useful in explaining the operation of the boosting and step-down switching regulator controlling circuit shown in FIG. 8.

In addition, an embodiment in the case where the triangular wave for boosting crosses the triangular wave for step-down is shown as a fourth embodiment. Normally, if the triangular waves cross each other, then the boosting operation and the step-down operation will be mixedly carried out. However, a latch circuit 50, as shown in FIG. 8, is provided in the after stage of the comparison circuit for boosting and the comparison circuit for step-down, whereby the boosting operation and the step-down operation are individually carried out without being mixed with each other. First of all, a reset signal which is synchronous with the output signal of the oscillation circuit is outputted to be used in the form of a reset signal of the latch circuit. If the triangular wave for step-down crosses Verr, then the level of VcompD becomes "L" during one period of the oscillation frequency. Since an inverted signal of VcompD is used as a reset pulse of the latch circuit, a data signal having a level "H" is outputted from the latch circuit. Then, the level of the data signal is held at "H" until a next reset signal is inputted. Then, there is the possibility that if the output-voltage Verr of the error amplifying circuit is outputted at a time point when the triangular wave for boosting is crossing the triangular wave for step-down, then the level of VcompU becomes "H" when VcompD having a level "H" is being outputted. However, in the case where the error amplifying circuit outputs the output voltage Verr at a time point when the triangular wave for boosting is crossing the triangular wave for step-down, after outputting the reset-signal, the level of VcompD becomes necessarily "L" before the level of VcompU becomes "H". Consequently, the level of VcompD becomes "L" after outputting the reset signal, which results in that the latch circuit recognizes this operation as the step-down operation and then outputs the data output having a level "HH". Only the signal having a level "L" is outputted from VcompU1 which is NOR-tied with the output signal of the comparison circuit for boosting. In other words, the latch circuit is provided, whereby as shown in FIG. 9, when the level of VcompD becomes "L" during one period of the oscillation frequency, this operation is regarded as the step-down operation, and only the step-down operation is carried out without carrying out the boosting operation even if VcompU operates during that one period to try to operate the switch for boosting.

Now, the merit and the demerit due to the positional relationship between the triangular waves will be described. Comparing the case where the triangular wave for boosting crosses the triangular wave for step-down with the case where there is no crossing between the triangular wave for boosting and the triangular wave for step-down, there is such a merit that the former has the higher response speed at which the operation is switched from the boosting operation to the step-down operation, or from the step-down operation to the boosting operation. On the other hand, in the case where there is no crossing between the triangular wave for boosting and the triangular wave for step-down, when the boosting operation and the step-down operation are switched over to each other, there is necessarily the state in which the step-down operation has the duty ratio of 100% and the boosting operation has the duty ratio of 0%. Then, since this part has a voltage width of some degree, it takes time more or less to switch the boosting operation and the step-down operation over to each other to make the transient response worse. However, when the triangular wave for boosting crosses the triangular wave for step-down, since only there is either the operation for controlling the oscillation of the step-down switch or the operation for controlling the oscillation of the boosting switch, either operation is necessarily carried out. As a result, a time required to switch the boosting operation and the step-down operation over to each other is neglected. However, the demerit when the triangular wave for boosting crosses the triangular wave for step-down is such that since either the MIN duty ratio for boosting or the MAX duty ratio for step-down is omitted, the stability becomes relatively poor. The ideal condition is such that the triangular wave for boosting and the triangular wave for step-down are generated without a break and the switching from the boosting operation to the step-down operation can be carried out with linearity. However, in actual, it is difficult to realize such a situation and hence it is necessary to select whether or not the triangular wave for boosting and the triangular wave for step-down are made to cross each other.

Now, while the crossing between the triangular wave for boosting and the triangular wave for step-down has been described, in the case as well, as the third embodiment, where the output voltage of the error amplifying circuit is given a voltage width, it is understood that the same effect is shown by judging whether the voltage width is made larger than the peak to peak of the triangular wave or smaller than the peak to peak of the triangular wave.

In addition, while in the fourth embodiment, the MIN duty ratio for boosting is removed, it is understood that the same effect is shown in the case as well where the MAX duty ratio for step-down is removed and the MIN duty ratio for boosting is set to 0%.

Fifth Embodiment

Figure 10:
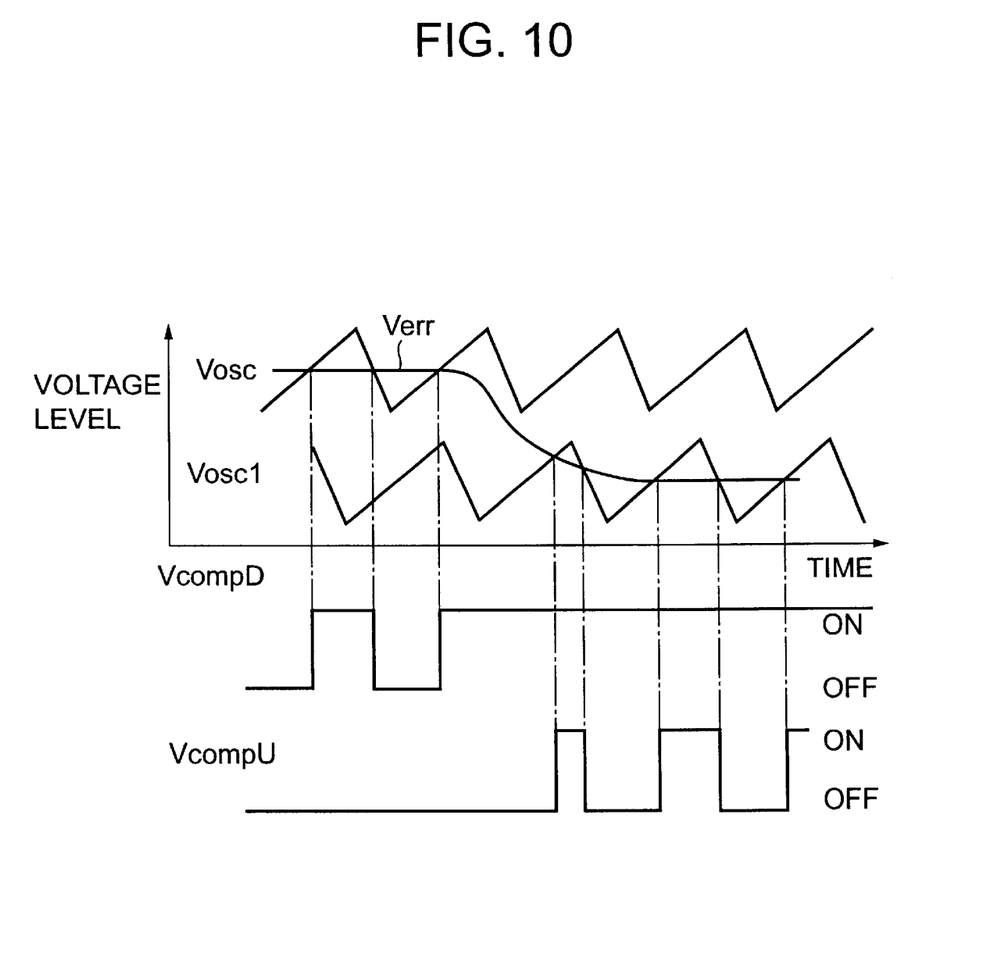
FIG. 10 is a timing chart useful in explaining the operation of a boosting and step-down switching regulator controlling circuit according to a fifth embodiment of the present invention.

In addition, while the description has been given with respect to the specific case where the triangular wave for boosting and the triangular wave for step-down are synchronous with each other, the case where the triangular wave for boosting and the triangular wave for step-down are asynchronous with each other will be described as a fifth embodiment with reference to FIG. 10. Even when the triangular wave for boosting and the triangular wave for step-down are asynchronous with each other, the boosting and step-down control is carried out in a period of the triangular wave for boosting if the operation enters into the boosting operation and in a period of the triangular wave for step-down if the operation enters into the step-down operation. Even if the triangular wave for boosting and the triangular wave for step-down are asynchronous with each other, the present invention is applied thereto and the operation is surely carried out. In addition, even when the oscillation frequencies are different between them, since the step-down operation and the boosting operation are carried out with the respective oscillation frequencies similarly to the case of asynchronization between them, the present invention is applied thereto. For this reason, the present invention does not refer to the synchronization, and the asynchronization of the triangular waves, and the agreement and disagreement of the oscillation frequencies at all.

In addition, the present invention aims at carrying out readily the switching between the boosting operation and the step-down operation to enhance remarkably the efficiency even in a circuit including one error amplifying circuit, and a triangular wave for boosting and a triangular wave for step-down, or in a circuit in which an output voltage of an error amplifying circuit is given a voltage width in a boosting and step-down switching regulator. Consequently, the present invention does not refer to a connection method for switches, a coil, and diode capacities as in the first or second embodiment at all. Then, it is obvious that the present invention is applied to even a switching regulator circuit including at least one switch for boosting, one switch for step-down and one coil, and also including a switching regulator controlling circuit of the present invention.

As set forth hereinabove, according to the present invention, there is offered the effect that the boosting operation and the step-down operation of a boosting and step-down switching regulator can be readily switched over to each other in accordance with the relationship among an input voltage, an output voltage and an output current, and also it is possible to realize the enhancement of the transient response, the reduction of the current consumption and the enhancement of the efficiency.

While the present invention has been particularly shown and described with reference to the preferred embodiments, it will be understood that the various changes and modifications will occur to those skilled in the art without departing from the scope and true spirit of the invention. The scope of the invention is, therefore, to be determined solely by the appended claims.

What is claimed is:

1. A switching regulator controlling circuit, comprising:
   an error amplifying circuit for receiving as its input, an output voltage obtained through resistive division at one terminal thereof, receiving as its input a reference voltage at the other terminal thereof and comparing the output voltage and the reference voltage;
   a comparison circuit for step-down having one terminal connected to a first oscillation circuit and having the other terminal connected to an output terminal of said error amplifying circuit; and
   a comparison circuit for boosting having one terminal connected to a second oscillation circuit different in voltage level from said first oscillation circuit and having the other terminal connected to said error amplifying circuit.

2. A switching regulator controlling circuit according to claim 1, wherein output waveforms of said first and second oscillation circuits are triangular waves.

3. A switching regulator controlling circuit according to claim 2, wherein the triangular waves as the output waveforms of said first and second oscillation circuits are synchronous with each other and are outputted without crossing.

4. A boosting and step-down switching regulator controlling circuit, comprising:
   a reference voltage circuit for supplying a reference voltage to an error amplifying circuit,
   wherein a triangular wave is outputted from an oscillation circuit, an output for step-down and an output for boosting different in voltage level from each other are generated from an output terminal of an error amplifying circuit, the output for step-down of said error amplifying circuit is compared with the triangular wave in a comparison circuit for step-down, the output for boosting of said error amplifying circuit is compared with the triangular wave in a comparison circuit for boosting, and either the boosting operation or the step-down operation is carried out with rectangular waves outputted from said comparison circuit for step-down and said comparison circuit for boosting, respectively, to keep an output voltage constant.

5. A boosting and step-down switching regulator controlling circuit according to claim 4, wherein each of voltage levels of the output for step-down and the output for boosting different from each other of said error amplifying circuit is higher than a peak to peak of each of the triangular waves outputted from said oscillation circuit.

6. A boosting and step-down switching regulator controlling circuit according to claim 2, wherein the triangular waves as the output waveforms of said first and second oscillation circuits are asynchronous with each other.

7. A boosting and step-down switching regulator controlling circuit according to claim 4, wherein the triangular waves as the output waveforms of said first and second oscillation circuits are asynchronous with each other.

8. A boosting and step-down switching regulator controlling circuit according to claim 1, wherein the oscillation frequencies of said first and second oscillation circuits are different from each other.

9. A boosting and step-down switching regulator controlling circuit according to claim 4, wherein the oscillation frequencies of said first and second oscillation circuits are different from each other.

10. A switching regulator according to claim 1, wherein a boosting and step-down switching regulator controlling circuit is. employed.

11. A switching regulator according to claim 4, wherein a boosting and step-down switching regulator controlling circuit is employed.

* * * * *